United States Patent
Tang et al.

(10) Patent No.: US 10,790,893 B2
(45) Date of Patent: Sep. 29, 2020

(54) SIGNAL TRANSMISSION METHOD AND APPARATUS

(71) Applicant: GUANGDONG OPPO MOBILE TELECOMMUNICATIONS CORP., LTD., Dongguan, Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/338,390

(22) PCT Filed: Sep. 30, 2016

(86) PCT No.: PCT/CN2016/101104
§ 371 (c)(1),
(2) Date: Mar. 29, 2019

(87) PCT Pub. No.: WO2018/058537
PCT Pub. Date: Apr. 5, 2018

(65) Prior Publication Data
US 2020/0028559 A1    Jan. 23, 2020

(51) Int. Cl.
*H04B 7/06* (2006.01)
*H04W 16/28* (2009.01)
*H04W 84/04* (2009.01)

(52) U.S. Cl.
CPC ........... *H04B 7/0628* (2013.01); *H04W 16/28* (2013.01); *H04W 84/042* (2013.01)

(58) Field of Classification Search
CPC .. H04B 7/0628; H04W 16/28; H04W 84/042; H04W 8/22; H04W 28/18; H04W 72/02; H04W 72/0413; H04W 72/046; H04J 13/0007
See application file for complete search history.

(56) References Cited

U.S. PATENT DOCUMENTS

| 2010/0159845 | A1 | 6/2010 | Kaaja et al. |
| 2012/0281567 | A1* | 11/2012 | Gao ..................... H04B 7/0626 370/252 |
| 2013/0286960 | A1 | 10/2013 | Li et al. |

(Continued)

FOREIGN PATENT DOCUMENTS

| CN | 103780357 | 5/2014 |
| CN | 104581967 | 4/2015 |
| CN | 105828450 | 8/2016 |

(Continued)

OTHER PUBLICATIONS

WIPO, ISR for PCT/CN2016/101104, dated Jun. 16, 2017.

(Continued)

*Primary Examiner* — Kabir A Timory
(74) *Attorney, Agent, or Firm* — Hodgson Russ LLP (57) ABSTRACT

A signal transmission method includes: a first terminal device sends at least one first sequence to a network device, a one-to-one correspondence existing between the at least one first sequence and the number of beams supported by the first terminal device, so that the network device can accurately measure beams and the terminal device can transmit uplink data by selecting proper beams.

17 Claims, 4 Drawing Sheets

(56) References Cited

U.S. PATENT DOCUMENTS

2015/0215763 A1* 7/2015 Ro .................... H04W 8/005
455/426.1
2019/0013842 A1* 1/2019 Xiong .................. H04B 7/0408

FOREIGN PATENT DOCUMENTS

| JP | 2014524705 | 9/2014 |
|----|------------|--------|
| WO | 2006031495 | 3/2006 |
| WO | 2016085235 | 6/2016 |

OTHER PUBLICATIONS

EPO, Office Action for EP Application No. 16917287.1, dated Jul. 18, 2019.
SIPO, First Office Action for CN Application No. 201680089673.6, dated May 8, 2020.
LG Electronics, "Discussion on PRACH preamble design and RACH procedure for NR," 3GPP TSG RAN WG1 Meeting #86, R1-166911, Aug. 2016, 8 pages.
Nokia et al., "Multi-Beam Common Control Plane Design," 3GPP TSG-RAN WG1 #86, R1-167280, Aug. 2016, 6 pages.
JPO, Office Action for JP Application No. 2019-517835, dated Aug. 7, 2020.

* cited by examiner

SIGNAL TRANSMISSION METHOD AND APPARATUS

CROSS-REFERENCE TO RELATED APPLICATION

This application is a U.S. national phase application of International Application No. PCT/CN2016/101104, filed Sep. 30, 2016, the entire disclosure of which is incorporated herein by reference.

TECHNICAL FIELD

The present disclosure relates to the field of communication, and more particularly, to a signal transmission method and a signal transmission apparatus in the field of communication.

BACKGROUND

In a future network system such as a 5G New Radio (NR) system, a beam access method is introduced. However, in the initial access process, there is no transmission channel for transmitting signaling between the network device and a terminal device. How to allow the network device to learn about beam access information (for example, the number of beams) is a problem urgently to be solved. In the process of initial access to a network, the terminal device sends access signals of a plurality of beams to the network device, such that the network device measures a plurality of beams based on the access signals of the plurality of beams. However, the network device cannot learn about access information of beams of the terminal device, and thus cannot make a measurement. Therefore, it is impossible to select proper beams to transmit uplink data.

SUMMARY

Embodiments of the present disclosure provide a signal transmission method and a signal transmission apparatus. A network device may obtain the number of beams supported by a terminal device, and then may measure the beams, such that the terminal device can select proper beams to transmit uplink data.

According to a first aspect, there is provided a signal transmission method. The method includes: sending, by a first terminal device, at least one first sequence to a network device. A first correspondence exists between the at least one first sequence and the number of beams supported by the first terminal device.

In a first possible implementation according to the first aspect, the first correspondence is indicative of each first sequence among the at least one first sequence being corresponding to a beam supported by the first terminal device and the number of the first sequences among the at least one first sequence being equal to that of the beams supported by the first terminal device.

In combination with the above possible implementation according to the first aspect, in a second possible implementation according to the first aspect, the sending, by a first terminal device, at least one first sequence to a network device includes:

respectively sending, by the first terminal device at a same moment but at different frequencies, each first sequence among the at least one first sequence to the network device; or respectively sending, by the first terminal device at the same frequency but at different moments, each first sequence among the at least one first sequence to the network device.

In combination with the above possible implementation according to the first aspect, in a third possible implementation according to the first aspect, before the sending, by a first terminal device, at least one first sequence to a network device, the method further includes: extending a second sequence by the first terminal device using a code division multiplexing manner to obtain the at least one first sequence.

In combination with the above possible implementation according to the first aspect, in a fourth implementation according to the first aspect, the at least one first sequence includes a third sequence and a fourth sequence, and the third sequence and the fourth sequence correspond to a beam of the first terminal device, wherein the sending, by a first terminal device, a first sequence to a network device includes: sending, by the first terminal device at a first moment, the third sequence to the network device; and sending, by the first terminal device at a second moment, the fourth sequence to the network device, wherein the first moment and the second moment are different moments.

In combination with the above possible implementation according to the first aspect, in a fifth implementation according to the first aspect, the sending, by a first terminal device, at least one first sequence to the network device includes: sending, by the first terminal device on a first physical resource, the at least one first sequence to the network device, wherein the first physical resource corresponds to the number of beams supported by the first terminal device.

In combination with the above possible implementation according to the first aspect, in a sixth implementation according to the first aspect, the method further includes: sending, by the first terminal device, a fifth sequence to the network device, wherein a second correspondence exists between the fifth sequence and the number of data retransmissions of the first terminal device.

According to a second aspect, there is provided a signal transmission method. The method includes: receiving, by a network device, at least one first sequence sent by a first terminal device, wherein a first correspondence exists between the at least one first sequence and the number of beams supported by the first terminal device; and determining, by the network device based on the at least one first sequence, the number of beams supported by the first terminal device.

In a first possible implementation according to the second aspect, the first correspondence is indicative of each first sequence among the at least one first sequence being corresponding to a beam supported by the first terminal device and the number of the first sequences among the at least one first sequence being equal to that of the beams supported by the first terminal device.

In combination with the above possible implementation according to the second aspect, in a second possible implementation according to the second aspect, the receiving, by a network device, at least one first sequence sent by a first terminal device includes: respectively receiving, by the network device, each first sequence among the at least one first sequence sent by the first terminal device at the same moment but at different frequencies; or respectively receiving, by the network device, each first sequence among the at least one first sequence sent by the first terminal device at the same frequency but at different moments.

In combination with the above possible implementation according to the second aspect, in a third possible implementation according to the second aspect, the at least one first sequence includes a third sequence and a fourth sequence, and the third sequence and the fourth sequence correspond to a beam of the first terminal device. The receiving, by a network device, at least one first sequence sent by a first terminal device includes: receiving, by the network device, the third sequence sent by the first terminal device at a first moment; and receiving, by the network device, the fourth sequence sent by the first terminal device at a second moment, wherein the first moment and the second moment are different moments.

In combination with the above possible implementation according to the second aspect, in a fourth implementation according to the second aspect, the receiving, by a network device, at least one first sequence sent by a first terminal device includes: receiving, by the network device, the at least one first sequence sent by the first terminal device on a first physical resource, wherein the first physical resource corresponds to the first number of beams. The method further includes: receiving, by the network device, at least one sixth sequence sent by the second terminal device on a second physical resource, wherein the second physical resource corresponds to the second number of beams, and the first number is greater than the second number; wherein a time domain resource of the first physical resource is greater than that of the second physical resource, and/or, a frequency domain resource of the first physical resource is greater than that of the second physical resource.

In combination with the above possible implementation according to the second aspect, in a fifth implementation according to the second aspect, the method further includes: receiving, by the network device, a fifth sequence sent by the first terminal device, wherein a second correspondence exists between the fifth sequence and the number of data retransmissions of the first terminal device.

According to a third aspect, there is provided a signal transmission method, which includes: sending, by a first terminal device, a fifth sequence to the network device, wherein a second correspondence exists between the fifth sequence and the number of data retransmissions of the first terminal device.

According to a fourth aspect, there is provided a signal transmission method, which includes: receiving, by the network device, a fifth sequence sent by the first terminal device, wherein a second correspondence exists between the fifth sequence and the number of data retransmissions of the first terminal device.

According to a fifth aspect, there is provided a signal transmission apparatus, which is configured to perform the method according to the first aspect or in any possible implementation according to the first aspect. Specifically, the apparatus includes a unit configured to perform the method according to the first aspect or the method according to any possible implementation manner in the first aspect.

According to a sixth aspect, there is provided a signal transmission apparatus, which is configured to perform the method according to the second aspect or in any possible implementation according to the second aspect. Specifically, the apparatus includes a unit configured to perform the method according to the second aspect or the method according to any possible implementation manner in the second aspect.

According to a seventh aspect, there is provided a signal transmission apparatus, which is configured to perform the method according to the first aspect or in any possible implementation according to the first aspect. Specifically, the apparatus includes a unit configured to perform the method according to the third aspect or in any possible implementation according to the third aspect.

According to an eighth aspect, there is provided a signal transmission apparatus, which is configured to perform the method according to the second aspect or in any possible implementation according to the second aspect. Specifically, the apparatus includes a unit configured to perform the method according to the fourth aspect or in any possible implementation manner according to the fourth aspect.

According to a ninth aspect, there is provided a system for transmitting a signal, which includes the apparatus according to the fifth aspect or in any possible implementation according to the fifth aspect and the apparatus according to the sixth aspect or in any possible implementation according to the sixth aspect.

According to a tenth aspect, there is provided a system for transmitting a signal, which includes the apparatus according to the seventh aspect or in any possible implementation according to the seventh aspect and the apparatus according to the eighth aspect or in any possible implementation according to the eighth aspect.

According to an eleventh aspect, there is provided a signal transmission apparatus, which includes a receiver, a transmitter, a memory, a processor, and a bus system. The receiver, the transmitter, the memory and the processor are connected via the bus system. The memory is configured to store instructions. The processor is configured to execute the instructions stored in the memory so as to control the receiver to receive a signal and control the transmitter to send a signal. When the processor executes the instructions stored in the memory, the processor is caused to perform the method according to the first aspect or in any possible implementation according to the first aspect.

According to a twelfth aspect, there is provided a signal transmission apparatus, which includes a receiver, a transmitter, a memory, a processor, and a bus system. The receiver, the transmitter, the memory and the processor are connected via the bus system. The memory is configured to store instructions. The processor is configured to execute the instructions stored in the memory so as to control the receiver to receive a signal and control the transmitter to send a signal. When the processor executes the instructions stored in the memory, the processor is caused to perform the method according to the second aspect or in any possible implementation according to the second aspect.

According to a thirteenth aspect, there is provided a signal transmission apparatus, which includes a receiver, a transmitter, a memory, a processor, and a bus system. The receiver, the transmitter, the memory and the processor are connected via the bus system. The memory is configured to store instructions. The processor is configured to execute the instructions stored in the memory so as to control the receiver to receive a signal and control the transmitter to send a signal. When the processor executes the instructions stored in the memory, the processor is caused to perform the method according to the third aspect or in any possible implementation according to the third aspect.

According to a fourteenth aspect, there is provided a signal transmission apparatus, which includes a receiver, a transmitter, a memory, a processor, and a bus system. The receiver, the transmitter, the memory and the processor are connected via the bus system. The memory is configured to store instructions. The processor is configured to execute the instructions stored in the memory so as to control the receiver to receive a signal and control the transmitter to send a signal. When the processor executes the instructions stored in the memory, the processor is caused to perform the method according to the fourth aspect or in any possible implementation according to the fourth aspect.

According to a fifteenth aspect, there is provided a computer-readable medium configured to store a computer program including instructions for performing the method according to the first aspect or in any possible implementation according to the first aspect.

According to a sixteenth aspect, there is provided a computer-readable medium configured to store a computer program including instructions for performing the method according to the second aspect or in any possible implementation according to the second aspect.

According to a seventeenth aspect, there is provided a computer-readable medium configured to store a computer program including instructions for performing the method according to the third aspect or in any possible implementation according to the third aspect.

According to an eighteenth aspect, there is provided a computer-readable medium configured to store a computer program including instructions for performing the method according to the fourth aspect or in any possible implementation according to the fourth aspect.

BRIEF DESCRIPTION OF THE DRAWINGS

To describe the technical solutions of the embodiments of the present disclosure more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by those of ordinary skills in the art based on the embodiments of the present disclosure without creative efforts shall fall within the protection scope of the present disclosure.

It is to be understood that the technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, and communication systems that may possibly appear in further, etc.

It is also to be understood that in the embodiments of the present disclosure, the terminal device may be referred to as user equipment (UE), a terminal device, a mobile station (MS), a mobile terminal or a mobile device in a further 5G network, etc. The terminal device may communicate with one or more core networks via radio access network (RAN). For example, the terminal may be a mobile telephone (also referred to as a cellular telephone) or a computer having a mobile terminal. For example, the terminal also may be a portable, pocket, hand-held, vehicle-mounted mobile apparatuses or a mobile apparatus with a built-in computer. These apparatuses interchange languages and/or data with the RAN.

The network device may be a Base Transceiver Station (BTS) in a Global System of Mobile (GSM) communication system or a Code Division Multiple Access (CDMA) system, a NodeB (NB) in a Wideband Code Division Multiple Access (WCDMA) system, an evolutional Node B (eNB or eNodeB) in a long term evolution (LTE) system, or a relay station, an access point, a vehicle-mounted device, a wearable device, a vehicle-mounted device, a wearable device, or an access network device in a future 5G network.

It is to be understood that the sequences such as the first sequence, the second sequence, the third sequence, the fourth sequence, the fifth sequence and the sixth sequence as mentioned in the embodiments of the present disclosure may be preamble sequences used for uplink synchronization or may be uplink demodulation reference signal (UL DMRS) sequences used for demodulating data of the terminal device. A sequence group may be a preamble or a sequence used for demodulating the UL DMRS.

Figure 1:
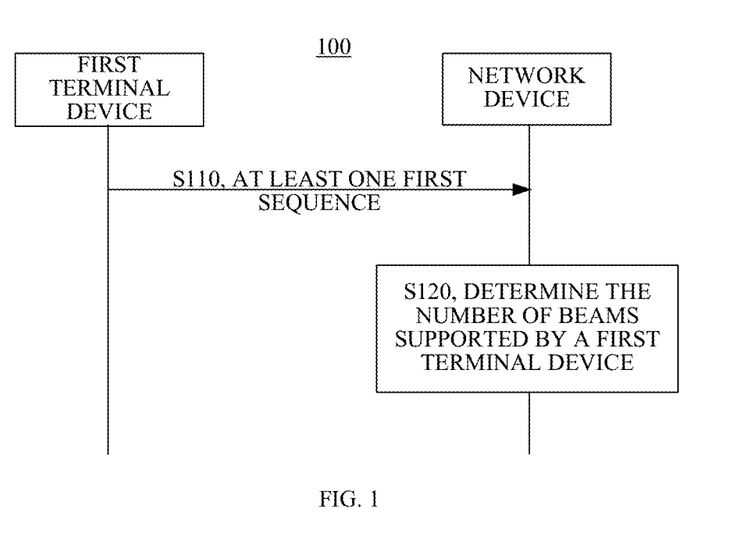
FIG. 1 is a schematic diagram of a signal transmission method according to an embodiment of the present disclosure.

FIG. 1 illustrates a schematic flowchart of a method 100 for transmitting a signal according to an embodiment of the present disclosure. FIG. 1 illustrates steps or operations of the signal transmission method. However, these steps or operations are merely exemplary, and the embodiments of the present disclosure also may perform other operations or variants of the operations in FIG. 1. The method 100 includes following steps.

In Step S110, a first terminal device sends at least one first sequence to a network device, wherein a first correspondence exists between the at least one first sequence and the number of beams supported by the first terminal device.

Specifically, the first terminal device sends the at least one first sequence to the network device, and the network device may determine the number of beams supported by the first terminal device based on the at least one first sequence and the first correspondence. In this way, the network device may obtain the number of beams supported by the first terminal device, which may lay a foundation for the network device to measure beams subsequently, such that the network device can accurately measure beams and the terminal device can select proper beams to transmit uplink data.

It is to be understood that the first correspondence may indicate that the number of the first sequences is equal to that of the beams supported by the first terminal device and any first sequence corresponds to any beam, or a particular first sequence only corresponds to a particular beam. Of course, the first correspondence may indicate that the number of the first sequences is not equal to that of the beams supported by the first terminal device. For example, if one beam corresponds to two sequences, the number of the first sequences is double that of the beams supported by the terminal device. Supposing a first first sequence corresponding to one beam is not accurately transmitted to the network device, the terminal device may send a second first sequence to the network device to ensure information on the beam can be accurately transmitted to the network device so as to enhance reliability of access. More further, when the terminal device does not receive, within particular time, the information on the beam corresponding to the first sequence fed back by the network, the terminal device may determine that the network does not receive the first first sequence, and the terminal device may continue sending the second first sequence to ensure that the network device can accurately receive the first sequence. In this way, the reliability of beam access is enhanced.

As an example, supposing the first terminal device supports two beams, there exists one sequence group including two beams, i.e., Beam 1 and Beam 2. An uplink access sequence 1 and an uplink access sequence 2 of the two beams are sent to the network device, wherein the Beam 1 corresponds to the uplink access sequence 1, and the Beam 2 corresponds to the uplink access sequence 2. When the network device receives the uplink access sequence 1, the uplink access sequence 1 is regarded as an access signal sent from the Beam 1. When the network device receives the uplink access sequence 2, the uplink access sequence 2 is regarded as an access signal sent from the Beam 2. The network device may measure the two sequences, detect a beam corresponding to the uplink access sequence having a higher signal intensity, and inform the terminal device of the uplink access sequence as a beam for transmitting uplink data, and the terminal device utilizes the beam having the signal intensity to transmit data.

It is to be understood that the first correspondence existing between the at least one first sequence and the number of beams supported by the first terminal device may be configured by a network or stipulated in an agreement, but the embodiments of the present disclosure are not limited thereto.

As an optional embodiment, before Step S110, the method 100 further includes: selecting a sequence group by the first terminal device based on the number of beams supported by the first terminal device, wherein the sequence group corresponds to the number of beams supported by the first terminal device. Step S110 includes: sending, by the first terminal device to the network device, the at least one first sequence selected from the sequence group, and receiving, by the network device, the at least one first sequence selected from the sequence group and sent by the first terminal device.

As an optional embodiment, supposing the sequence group includes the at least one first sequence, a correspondence exists between the number of the first sequences included in the sequence group and the number of beams supported by the first terminal device. For example, the number of the first sequences in the sequence group is equal to that of beams supported by the first terminal device. For another example, the network device may learn the number of beams supported by the first terminal device as long as the first terminal device sends one first sequence in the sequence group to the network device. For still another example, the network device may learn that the first terminal device supports N beams when the first terminal device sends N sequences in the sequence group to the network device. That is, the network device may learn the number of beams supported by the first terminal device as long as a sequence sent by the first terminal device is a first sequence from the sequence group. The correspondence between the sequence group and the number of beams supported by the first terminal device may be configured for the terminal device by the network device or may be stipulated in an agreement, but the embodiments of the present disclosure are not limited thereto.

Before Step S110, there are three manners for the terminal device to determine the at least one first sequence.

In the first manner, the terminal device selects a sequence from the sequence group corresponding to the number of beams supported by the terminal device to obtain the at least one first sequence. More further, supposing the first terminal device and the second terminal device support equal number of beams, these equal number of beams supported may have one sequence group including a plurality of subgroup sequences. Each subgroup sequence has subsequences whose number is equal to the number of beams supported by the terminal device. Both the first terminal device and the second terminal device may send subsequences in the subgroup sequences to the network device. In this way, the terminal device supporting an equal number of beams may inform the network device of the number of beams supported by the terminal device. For example, supposing the first sequence group includes three subgroup sequences, each subgroup sequence includes two subsequences, i.e., one subgroup sequence in the first sequence group corresponds to one terminal device supporting two beams. Supposing that both the existing first terminal device and the second terminal device support two beams, the first terminal device randomly selects one subsequence group from the three subsequence groups as its own subsequence group, and then the two subsequences in the subgroup sequence respectively correspond to two beams of the first terminal device, and then the two subsequences are sent to the network device. In this way, the network device may learn that the first terminal device supports two beams, then measures the beams sending the two sequences, and selects a beam having a good signal intensity as the beam for transmitting uplink data by the first terminal device. The second terminal device randomly selects one subsequence group from the three subsequence groups as its own subsequence group, wherein the two subsequences in the subsequence group selected by the second terminal device respectively correspond to two beams of the second terminal device, and then the second terminal device send the two subsequences to the network device. In this way, the network device may learn that the second terminal device supports two beams, then measures the beams sending the two sequences, and selects a beam having a good signal intensity as the beam for transmitting uplink data by the second terminal device.

In the second manner, the first terminal device extends a second sequence using a code division multiplexing manner to obtain the at least one first sequence. The terminal device randomly selects a sequence from the corresponding sequence group, and extends the selected sequence using a first extending manner to obtain the at least one first sequence. For example, the first extending manner may be the code division multiplexing (CDM). For example, after randomly selecting a sequence, the terminal device supporting two beams uses a Walsh code to perform time domain extension on the selected sequence. Supposing a beam direction corresponding to [1, 1] is 1 and a beam direction corresponding to [1, −1] is 2, the at least one first sequence obtained after the extension is sent to the network device. Specifically, which manners does the first terminal device uses to extend and a basic decoded word uses in the process of extension may be stipulated in an agreement or configured by a network, but the embodiments of the present disclosure are not limited thereto.

In the third manner, the first terminal device selects and sends a particular physical resource to the at least one first sequence. For example, the terminal device selects, from a sequence group, sequences consistent with the number of beams supported by the terminal device, and sends the sequences on the particular physical resource. The particular physical resource corresponds to the number of beams supported by the first terminal device. For example, the first terminal device sends, on a first physical resource, the at least one first sequence to the network device, wherein the first physical resource corresponds to the number of beams supported by the first terminal device. More specifically, the network device receives the at least one first sequence sent by the first terminal device on the first physical resource, wherein the first physical resource corresponds to the first number of beams. The method 100 further includes: receiving, by the network device, at least one sixth sequence sent by the second terminal device on a second physical resource, wherein the second physical resource corresponds to the second number of beams, and the first number is greater than the second number. A time domain resource of the first physical resource is greater than that of the second physical resource, and/or, a frequency domain resource of the first physical resource is greater than that of the second physical resource. That is, the more the transmitted sequences are, the more the occupied physical resources are. Different physical resources may be allocated to terminal devices supporting different numbers of beams, but equal quantity of physical resources are not allocated to all the terminal devices. Therefore, utilization ratio of resources may be enhanced. Some particular time domain resources are set and only allocated to a terminal device supporting particular number of beams. Specifically, the correspondence between the resources and the number of beams supported by the terminal device may be configured by a network or stipulated in an agreement.

It is to be understood that the at least one first sequence may be determined by combining the above three manners. For example, a combination of the first manner and the second manner: the sequence group may be divided into different subsequence groups, and these subsequence groups are allocated to different physical resources. For example, the first subsequence group corresponds to the first physical resource, the first physical resource correspondingly supports the first number of terminal devices, and the first subsequence group includes the at least one first sequence. The second subsequence group corresponds to the second physical resource, and the second physical resource correspondingly supports the second number of terminal devices. A combination of the second manner and the third manner: for example, the at least one first sequence extended using the CDM method is allocated to different time-frequency resources.

As an optional embodiment, the first correspondence is indicative of each first sequence among the at least one first sequence being corresponding to a beam supported by the first terminal device and the number of the first sequences among the at least one first sequence being equal to that of the beams supported by the first terminal device.

As an optional embodiment, Step S110 includes: respectively sending, by the first terminal device at the same moment but at different frequencies, each first sequence among the at least one first sequence to the network device; or respectively sending, by the first terminal device at the same frequency but at different moments, each first sequence among the at least one first sequence to the network device. The receiving, by a network device, at least one first sequence sent by a first terminal device includes: respectively receiving, by the network device, each first sequence among the at least one first sequence sent by the first terminal device at the same moment but at different frequencies; or respectively receiving, by the network device, each first sequence among the at least one first sequence sent by the first terminal device at the same frequency but at different moments.

Specifically, supposing the first terminal device supports N beams and the number of the first sequences is N, the N first sequences may be respectively sent to the network device at the same frequency but at different moments or may be respectively sent to the network device at the same moment but at different frequencies, which may be configured by a network or stipulated in an agreement, but the embodiments of the present disclosure are not limited thereto.

As an optional embodiment, the at least one first sequence includes a third sequence and a fourth sequence, and the third sequence and the fourth sequence correspond to a beam of the first terminal device, wherein Step S110 includes: sending, by the first terminal device at a first moment, the third sequence to the network device; and sending, by the first terminal device at a second moment, the fourth sequence to the network device, wherein the first moment and the second moment are different moments. That is, two sequences may correspond to one beam, and the two sequences may be sent to the network device at different moments. Specifically, interval time between the first moment and the second moment may be interval time configured by a network or stipulated in an agreement, but the embodiments of the present disclosure are not limited thereto. Of course, a plurality of sequences may correspond to one beam. Therefore, information on one beam may be transmitted by means of the plurality of sequences, which may further ensure reliability beam access.

In Step S120, a network device receives at least one first sequence sent by a first terminal device, and the network device determines, based on the at least one first sequence, the number of beams supported by the first terminal device.

As an optional embodiment, the method 100 further includes: sending, by the first terminal device, a fifth sequence to the network device, wherein a second correspondence exists between the fifth sequence and the number of data retransmissions of the first terminal device. More further, the second correspondence is indicative of the number of fifth sequences among the at least one fifth sequence being equal to that of data retransmissions of the first terminal device. That is, the first terminal device may send at least one first sequence, wherein the first correspondence exists between the at least one first sequence and the number of beams supported by the first terminal device; and the first terminal device also may send at least one fifth sequence, wherein the second correspondence exists between the at least one fifth sequence and the retransmission data of the first terminal device.

Figure 2:
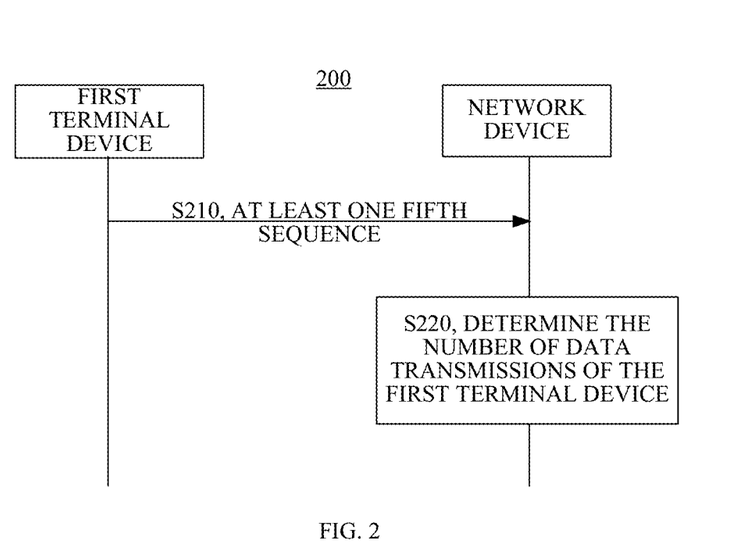
FIG. 2 is a schematic diagram of another signal transmission method according to an embodiment of the present disclosure.

FIG. 2 illustrates a schematic flowchart of a method 200 for transmitting a signal according to an embodiment of the present disclosure. FIG. 2 illustrates steps or operations of the signal transmission method. However, these steps or operations are merely exemplary, and the embodiments of the present disclosure also may perform other operations or variants of the operations in FIG. 2. The method 200 includes following steps.

In Step S210, the first terminal device sends at least one fifth sequence to the network device, wherein the second correspondence exists between the fifth sequence and the number of data retransmissions of the first terminal device. The second correspondence may be configured for the terminal device by the network device or stipulated in an agreement, but the embodiments of the present disclosure are not limited thereto. For example, if the first terminal device retransmits data one time, the first terminal device selects the fifth sequence from a sequence group having a number of times of one, and sends the fifth sequence to the network device, such that the network device may detect the fifth sequence and learn that the first terminal device retransmits the data one time.

In Step S220, the network device receives at least one fifth sequence sent by the first terminal device, and determines, based on the at least one fifth sequence, the number of data retransmissions of the first terminal device.

Specifically, in an unscheduled transmission or a contention access, the terminal device may need to transmit or access for many times. When the first terminal device has been retransmitted for many times, the network device does not learn the number of transmissions of the first terminal device. The network device may preferentially select the terminal device with a larger number of retransmissions to give priority access, but how can the network device learn the fifth sequence sent by the terminal device. Therefore, the first terminal device may send access information in a sequence manner in a contention access or an unscheduled transmission each time. For example, the sequence may be divided into four groups, and the numbers of retransmissions respectively corresponding to the four groups of sequences are 1, 2, 3 and 4. The correspondence between the specific sequence groups and the numbers of retransmissions may be configured by a network or stipulated in an agreement. When the terminal device retransmits 4 times, the terminal device selects a sequence from the sequence group with 4 retransmissions and sends the sequence to the network device. Since the network device can obtain, in advance, the correspondence between the sequence and the number of transmission, the number of retransmissions of the first terminal device may be determined based on the correspondence between the sequence and the number of transmission, and then the terminal device having a higher number of retransmissions is preferentially selected to access a network or transmit data. In this way, an access success rate or a data transmission success rate is ensured.

The signal transmission method according to an embodiment of the present disclosure is described above with reference to FIG. 1 and FIG. 2. A signal transmission apparatus according to an embodiment of the present disclosure is described below with reference to FIG. 3-FIG. 10.

Figure 3:
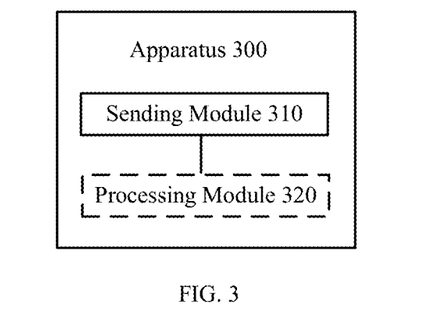
FIG. 3 is a schematic block diagram of a signal transmission apparatus according to an embodiment of the present disclosure.

FIG. 3 illustrates a schematic diagram of an apparatus 300 for transmitting a signal according to an embodiment of the present disclosure. The apparatus may be, for example, the terminal device in the method 100. The apparatus 300 includes:

a sending module 310, configured to send at least one first sequence to a network device, wherein a first correspondence exists between the at least one first sequence and the number of beams supported by the apparatus.

As an optional embodiment, the first correspondence is indicative of each first sequence among the at least one first sequence being corresponding to a beam supported by the apparatus and the number of the first sequences among the at least one first sequence being equal to that of the beams supported by the apparatus.

As an optional embodiment, the sending module 310 is specifically configured to:

respectively send, at the same moment but at different frequencies, each first sequence among the at least one first sequence to the network device; or respectively send, at the same frequency but at different moments, each first sequence among the at least one first sequence to the network device.

As an optional embodiment, the apparatus 300 further includes a processing module 320, which is configured to extend, before sending at least one first sequence to the network device, a second sequence using a code division multiplexing manner to obtain the at least one first sequence.

As an optional embodiment, the at least one first sequence includes a third sequence and a fourth sequence, and the third sequence and the fourth sequence correspond to a beam of the apparatus 300. The sending module 310 is specifically configured to send the third sequence to the network device at a first moment, and send the fourth sequence to the network device at a second moment, wherein the first moment and the second moment are different moments.

As an optional embodiment, the sending module 310 is specifically configured to send, on a first physical resource, the at least one first sequence to the network device, wherein the first physical resource corresponds to the number of beams supported by the apparatus.

As an optional embodiment, the sending module 310 is further configured to send a fifth sequence to the network device, wherein a second correspondence exists between the fifth sequence and the number of data retransmissions of the apparatus.

Figure 4:
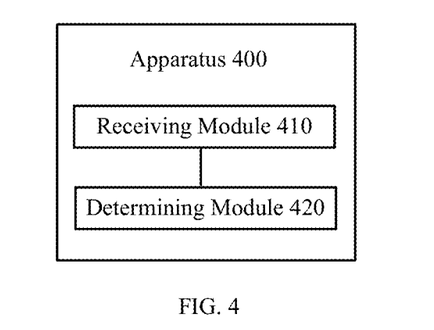
FIG. 4 is a schematic block diagram of another signal transmission apparatus according to an embodiment of the present disclosure.

FIG. 4 illustrates a schematic diagram of an apparatus 400 for transmitting a signal according to an embodiment of the present disclosure. The apparatus may be, for example, the network device in the method 100. The apparatus 400 includes:

a receiving module 410, configured to receive at least one first sequence sent by a first terminal device, wherein a first correspondence exists between the at least one first sequence and the number of beams supported by the first terminal device; and a determining module 420, configured to determine, based on the at least one first sequence, the number of beams supported by the first terminal device.

As an optional embodiment, the first correspondence is indicative of each first sequence among the at least one first sequence being corresponding to a beam supported by the first terminal device and the number of the first sequences among the at least one first sequence being equal to that of the beams supported by the first terminal device.

As an optional embodiment, the receiving module 410 is specifically configured to respectively receive each first sequence among the at least one first sequence sent by the first terminal device at the same moment but at different frequencies, or respectively receive each first sequence among the at least one first sequence sent by the first terminal device at the same frequency but at different moments.

As an optional embodiment, the receiving module 410 is specifically configured to:

receive the third sequence sent by the first terminal device at a first moment; and receive the fourth sequence sent by the first terminal device at a second moment, wherein the first moment and the second moment are different moments.

As an optional embodiment, the receiving module 410 is further specifically configured to:

receive the at least one first sequence sent by the first terminal device on a first physical resource, wherein the first physical resource corresponds to the first number of beams; and receive at least one sixth sequence sent by the second terminal device on a second physical resource, wherein the second physical resource corresponds to the second number of beams, and the first number is greater than the second number.

A time domain resource of the first physical resource is greater than that of the second physical resource, and/or, a frequency domain resource of the first physical resource is greater than that of the second physical resource.

As an optional embodiment, the receiving module 410 is further configured to:

receive a fifth sequence sent by the first terminal device, wherein a second correspondence exists between the fifth sequence and the number of data retransmissions of the first terminal device.

Figure 5:
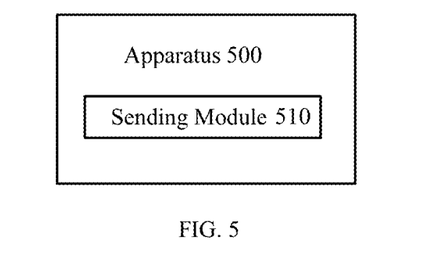
FIG. 5 is a schematic block diagram of still another signal transmission apparatus according to an embodiment of the present disclosure.

FIG. 5 illustrates a schematic diagram of an apparatus 500 for transmitting a signal according to an embodiment of the present disclosure. The apparatus may be, for example, the network device in the method 200. The apparatus 500 includes:

a sending module 510, configured to send a fifth sequence to the network device, wherein a second correspondence exists between the fifth sequence and the number of data retransmissions of the apparatus.

Figure 6:
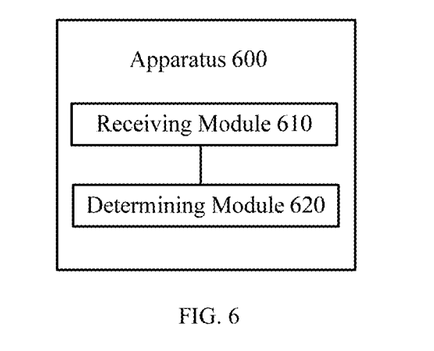
FIG. 6 is a schematic block diagram of still another signal transmission apparatus according to an embodiment of the present disclosure.

FIG. 6 illustrates a schematic diagram of an apparatus 600 for transmitting a signal according to an embodiment of the present disclosure. The apparatus may be, for example, the network device in the method 600. The apparatus 600 includes:

a receiving module 610, configured to receive a fifth sequence sent by the first terminal device, wherein a second correspondence exists between the fifth sequence and the number of data retransmissions of the first terminal device; and a determining module 620, configured to determine, based on the at least one fifth sequence, the number of data retransmissions of the first terminal device.

Figure 7:
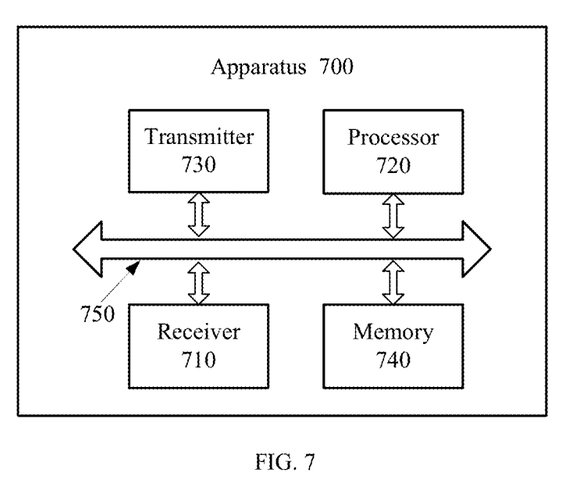
FIG. 7 is a schematic block diagram of still another signal transmission apparatus according to an embodiment of the present disclosure.

FIG. 7 illustrates an apparatus 700 for transmitting a signal according to an embodiment of the present disclosure. For example, the apparatus 700 may be the terminal device in the method 100. The apparatus 700 includes a receiver 710, a processor 720, a transmitter 730, a memory 740, and a bus system 750. The receiver 710, the processor 720, the transmitter 730 and the memory 740 are connected via the bus system 750. The memory 740 is configured to store instructions. The processor 720 is configured to execute the instructions stored in the memory 740 so as to control the receiver 710 to receive a signal and control the transmitter 730 to send a signal.

The transmitter 730 is configured to send at least one first sequence to a network device, wherein a first correspondence exists between the at least one first sequence and the number of beams supported by the apparatus.

It should be understood that the apparatus 700 specifically may be the terminal device in the method 100 according to the above embodiments, and may be configured to perform each step and/or flow corresponding to the terminal device. Optionally, the memory 740 may include a read-only memory (ROM) and a random access memory (RAM), and provide instructions and data to the processor. The memory also may partly include a non-volatile random access memory. For example, the memory also may store information of device type. The processor 720 may be configured to execute the instructions stored in the memory, and when the processor executes the instructions, the processor may perform each step corresponding to the terminal device in the embodiments of the above method 100.

Figure 8:
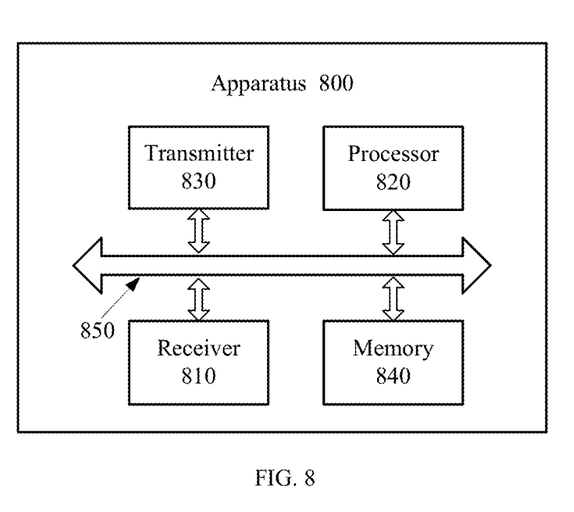
FIG. 8 is a schematic block diagram of still another signal transmission apparatus according to an embodiment of the present disclosure.

FIG. 8 illustrates an apparatus 800 for transmitting a signal according to an embodiment of the present disclosure. For example, the apparatus 800 may be the network device in the method 100. The apparatus 800 includes a receiver 810, a processor 820, a transmitter 830, a memory 840, and a bus system 850. The receiver 810, the processor 820, the transmitter 830 and the memory 840 are connected via the bus system 850. The memory 840 is configured to store instructions. The processor 820 is configured to execute the instructions stored in the memory 840 so as to control the receiver 810 to receive a signal and control the transmitter 830 to send a signal.

The receiver 810 is configured to receive at least one first sequence sent by a first terminal device, wherein a first correspondence exists between the at least one first sequence and the number of beams supported by the first terminal device. The processor 820 is configured to determine, based on the at least one first sequence, the number of beams supported by the first terminal device.

It should be understood that the apparatus 800 specifically may be the network device in the method 100 according to the above embodiments, and may be configured to perform each step and/or flow corresponding to the network device. Optionally, the memory 840 may include a read-only memory (ROM) and a random access memory (RAM), and provide instructions and data to the processor. The memory also may partly include a non-volatile random access memory. For example, the memory also may store information of device type. The processor 820 may be configured to execute the instructions stored in the memory, and when the processor executes the instructions, the processor may perform each step corresponding to the network device in the embodiments of the above method 100.

Figure 9:
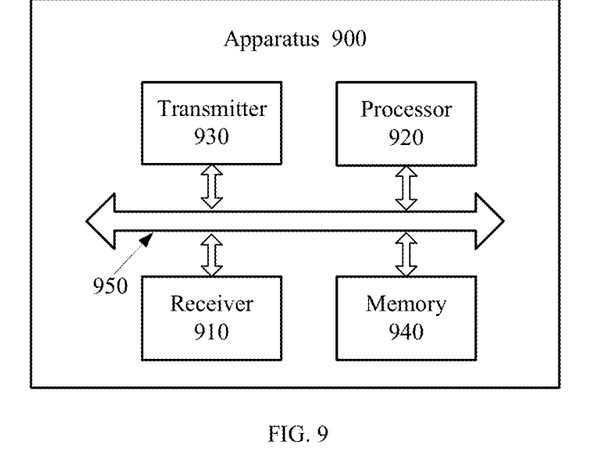
FIG. 9 is a schematic block diagram of still another signal transmission apparatus according to an embodiment of the present disclosure.

FIG. 9 illustrates an apparatus 900 for transmitting a signal according to an embodiment of the present disclosure. For example, the apparatus 900 may be the terminal device in the method 200. The apparatus 900 includes a receiver 910, a processor 920, a transmitter 930, a memory 940, and a bus system 950. The receiver 910, the processor 920, the transmitter 930 and the memory 940 are connected via the bus system 950. The memory 940 is configured to store instructions. The processor 920 is configured to execute the instructions stored in the memory 940 so as to control the receiver 910 to receive a signal and control the transmitter 930 to send a signal.

The transmitter 930 is configured to send a fifth sequence to the network device, wherein a second correspondence exists between the fifth sequence and the number of data retransmissions of the apparatus.

It should be understood that the apparatus 900 specifically may be the terminal device in the method 200 according to the above embodiments, and may be configured to perform each step and/or flow corresponding to the terminal device. Optionally, the memory 940 may include a read-only memory (ROM) and a random access memory (RAM), and provide instructions and data to the processor. The memory also may partly include a non-volatile random access memory. For example, the memory also may store information of device type. The processor 920 may be configured to execute the instructions stored in the memory, and when the processor executes the instructions, the processor may perform each step corresponding to the terminal device in the embodiments of the above method 200.

Figure 10:
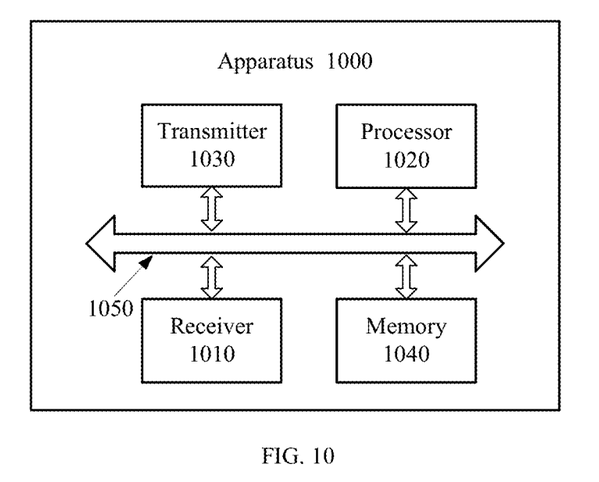
FIG. 10 is a schematic block diagram of still another signal transmission apparatus according to an embodiment of the present disclosure.

FIG. 10 illustrates an apparatus 1000 for transmitting a signal according to an embodiment of the present disclosure. For example, the apparatus 1000 may be the network device in the method 200. The apparatus 1000 includes a receiver 1010, a processor 1020, a transmitter 1030, a memory 1040, and a bus system 1050. The receiver 1010, the processor 1020, the transmitter 1030 and the memory 1040 are connected via the bus system 1050. The memory 1040 is configured to store instructions. The processor 1020 is configured to execute the instructions stored in the memory 1040 so as to control the receiver 1010 to receive a signal and control the transmitter 1030 to send a signal.

The receiver 1010 is configured to receive at least one first sequence sent by a first terminal device, wherein a first correspondence exists between the at least one first sequence and the number of beams supported by the first terminal device. The processor 1020 is configured to determine, based on the at least one first sequence, the number of beams supported by the first terminal device.

It should be understood that the apparatus 1000 specifically may be the network device in the method 200 according to the above embodiments, and may be configured to perform each step and/or flow corresponding to the network device. Optionally, the memory 1040 may include a read-only memory (ROM) and a random access memory (RAM), and provide instructions and data to the processor. The memory also may partly include a non-volatile random access memory. For example, the memory also may store information of device type. The processor 1020 may be configured to execute the instructions stored in the memory, and when the processor executes the instructions, the processor may perform each step corresponding to the network device in the embodiments of the above method 100.

It should be understood that in the embodiments of the present disclosure, the processor 720, the processor 820, the processor 920 and the processor 1020 may be central processing units (CPUs), or may be other general-purpose processors, digital signal processors (DSPs), application-specific integrated circuits (ASIC), field programmable gate arrays (FPGAs) or other programmable logic devices, discrete gates or a transistor logic devices, or discrete hardware components, etc. The general-purpose processor may be a microprocessor, or the processor may be any conventional processor or the like.

It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

It is to be understood that in the embodiments of the present disclosure, a sequence number of each step does not mean an execution sequence, and the execution sequence of each step shall be determined by its function and an internal logic, and shall not impose a limit on the implementation process of the embodiments of the present disclosure.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the present disclosure.

Persons skilled in the art may clearly understand that for a convenient and concise description, a concrete work process of systems, apparatuses and units described above may refer to a corresponding process of the foregoing method embodiments, which is not repeated anymore herein.

In the embodiments provided by the present disclosure, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For example, multiple units or components may be combined or integrated into another system, or some features may be ignored and not executed. For another thing, intercoupling or direct coupling or communications connection displayed or discussed may be indirect coupling or communications connection, electrical or mechanical or in other forms, by means of some interfaces, apparatuses or units.

The unit serving as a detached component may be or not be physically detached, the component serving as a unit display may be or not be a physical unit, i.e., either located at one place or distributed on a plurality of network elements. Units may be selected in part or in whole according to actual needs for achieving objectives of the solution of this embodiment.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium may include: a USB flash disk, a mobile hard disk, a read-only memory (ROM), a random access memory (RAM), a magnetic disk or an optical disk and other media capable of storing a program code.

The abovementioned embodiments are merely specific embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the protection scope of the present disclosure shall be subject to the protection scope of the claims.

What is claimed is:

1. A signal transmission method, comprising:
sending, by a first terminal device, at least one first sequence to a network device, wherein a first correspondence exists between the at least one first sequence and a number of beams supported by the first terminal device;
wherein the at least one first sequence comprises a third sequence and a fourth sequence, and the third sequence and the fourth sequence correspond to a beam of the first terminal device; and
the sending, by a first terminal device, a first sequence to a network device comprises:
sending, by the first terminal device at a first moment, the third sequence to the network device; and
sending, by the first terminal device at a second moment different from the first moment, the fourth sequence to the network device.

2. The method according to claim 1, wherein the first correspondence is indicative of each first sequence among the at least one first sequence corresponding to a beam supported by the first terminal device, and a number of the first sequences among the at least one first sequence being equal to the number of the beams supported by the first terminal device.

3. The method according to claim 1, wherein the sending, by a first terminal device, at least one first sequence to a network device comprises:
sending, by the first terminal device at a same moment but at different frequencies, each first sequence among the at least one first sequence to the network device; or
sending, by the first terminal device at a same frequency but at different moments, each first sequence among the at least one first sequence to the network device.

4. The method according to claim 1, further comprising:
extending a second sequence by the first terminal device using a code division multiplexing manner to obtain the at least one first sequence.

5. The method according to claim 1, wherein the sending, by a first terminal device, at least one first sequence to the network device comprises:
sending, by the first terminal device on a first physical resource, the at least one first sequence to the network device, wherein the first physical resource corresponds to the number of the beams supported by the first terminal device.

6. The method according to claim 1, further comprising:
sending, by the first terminal device, a fifth sequence to the network device, wherein a second correspondence exists between the fifth sequence and a number of data retransmissions of the first terminal device.

7. A signal transmission method, characterized in comprising:
receiving, by a network device, at least one first sequence sent by a first terminal device, wherein a first correspondence exists between the at least one first sequence and a number of beams supported by the first terminal device; and
determining, by the network device based on the at least one first sequence, the number of the beams supported by the first terminal device;
wherein the at least one first sequence comprises a third sequence and a fourth sequence, and the third sequence and the fourth sequence correspond to a beam of the first terminal device; and
the receiving, by a network device, at least one first sequence sent by a first terminal device comprises:
receiving, by the network device, the third sequence sent by the first terminal device at a first moment; and
receiving, by the network device, the fourth sequence sent by the first terminal device at a second moment different from the first moment.

8. The method according to claim 7, wherein the first correspondence is indicative of each first sequence among the at least one first sequence corresponding to a beam supported by the first terminal device, and a number of the first sequences among the at least one first sequence being equal to the number of the beams supported by the first terminal device.

9. The method according to claim 7, wherein the receiving, by a network device, at least one first sequence sent by a first terminal device comprises:
receiving, by the network device, each first sequence among the at least one first sequence sent by the first terminal device at a same moment but at different frequencies; or
receiving, by the network device, each first sequence among the at least one first sequence sent by the first terminal device at a same frequency but at different moments.

10. The method according to claim 7, wherein the receiving, by a network device, at least one first sequence sent by a first terminal device comprises:
receiving, by the network device, the at least one first sequence sent by the first terminal device on a first physical resource, wherein the first physical resource corresponds to a first number of the beams;
the method further comprises:
receiving, by the network device, at least one sixth sequence sent by the second terminal device on a second physical resource, wherein the second physical resource corresponds to a second number of the beams, and the first number is greater than the second number;
wherein the first physical resource and the second physical resource satisfy at least one of following:
a time domain resource of the first physical resource is greater than a time domain resource of the second physical resource, and
a frequency domain resource of the first physical resource is greater than a frequency domain resource of the second physical resource.

11. The method according to claim 7, further comprising:
receiving, by the network device, a fifth sequence sent by the first terminal device, wherein a second correspondence exists between the fifth sequence and a number of data retransmissions of the first terminal device.

12. A signal transmission apparatus, comprising:
a processor; and
a memory for storing instructions executable by the processor;
wherein the processor is configured to perform:
sending at least one first sequence to a network device, wherein a first correspondence exists between the at least one first sequence and a number of beams supported by a first terminal device;

wherein the at least one first sequence comprises a third sequence and a fourth sequence, and the third sequence and the fourth sequence correspond to a beam of the first terminal device; and the processor configured to perform sending a first sequence to a network device is configured to perform:
sending, at a first moment, the third sequence to the network device; and
sending, at a second moment different from the first moment, the fourth sequence to the network device.

13. The apparatus according to claim 12, wherein the first correspondence is indicative of each first sequence among the at least one first sequence corresponding to a beam supported by the first terminal device, and a number of the first sequences among the at least one first sequence being equal to the number of the beams supported by the first terminal device.

14. The apparatus according to claim 12, wherein the processor configured to perform sending at least one first sequence to a network device is configured to perform:
sending, at a same moment but at different frequencies, each first sequence among the at least one first sequence to the network device; or
sending, at a same frequency but at different moments, each first sequence among the at least one first sequence to the network device.

15. The apparatus according to claim 12, wherein the processor is further configured to perform:
extending a second sequence by the first terminal device using a code division multiplexing manner to obtain the at least one first sequence.

16. The apparatus according to claim 12, wherein the processor configured to perform sending at least one first sequence to the network device is configured to perform:
sending, on a first physical resource, the at least one first sequence to the network device, wherein the first physical resource corresponds to the number of the beams supported by the first terminal device.

17. The apparatus according to claim 12, the processor is further configured to perform:
sending a fifth sequence to the network device, wherein a second correspondence exists between the fifth sequence and a number of data retransmissions of the first terminal device.

* * * * *